United States Patent
Stevens et al.

(10) Patent No.: US 6,688,668 B2
(45) Date of Patent: Feb. 10, 2004

(54) RETAINER SYSTEM FOR VEHICLE SOFT TOPS AND TONNEAU COVERS

(75) Inventors: Michael C. Stevens, Arvada, CO (US); Rick H. Troeger, Westminster, CO (US); Nancy L. Brunner, deceased, late of Broomfield, CO (US), by Charles A. Brunner, Executor; Timothy J. Gile, Loveland, CO (US)

(73) Assignee: Bestop, Inc., Broomfield, CO (US)

( * ) Notice: Subject to any disclaimer, the term of this patent is extended or adjusted under 35 U.S.C. 154(b) by 0 days.

(21) Appl. No.: 10/282,427

(22) Filed: Oct. 29, 2002

(65) Prior Publication Data

US 2003/0102698 A1 Jun. 5, 2003

Related U.S. Application Data

(60) Provisional application No. 60/340,102, filed on Oct. 29, 2001.

(51) Int. Cl.[7] .................................................. B60P 7/04
(52) U.S. Cl. ............................ 296/100.16; 296/100.01; 296/100.18
(58) Field of Search ........................ 296/100.01, 100.11, 296/100.15, 100.16, 225, 100.17, 100.18; 160/395, 368.1, 370.1

(56) References Cited

U.S. PATENT DOCUMENTS

| | | | |
|---|---|---|---|
| 3,805,873 A | | 4/1974 | Bloomfield |
| 4,757,854 A | | 7/1988 | Rippberger |
| 5,058,652 A | | 10/1991 | Wheatley et al. |
| 5,322,337 A | * | 6/1994 | Rawlings et al. ........... 296/136 |
| 5,487,585 A | | 1/1996 | Wheatley |
| 5,765,903 A | | 6/1998 | Essig et al. |
| 5,887,934 A | | 3/1999 | Smith |
| 5,934,735 A | * | 8/1999 | Wheatley ............... 296/100.01 |
| 5,947,546 A | | 9/1999 | Hilliard et al. |
| 5,984,400 A | | 11/1999 | Miller et al. |
| 6,257,647 B1 | * | 7/2001 | Ninness et al. ........ 296/100.15 |
| 6,322,129 B2 | * | 11/2001 | Huotari ................. 296/100.15 |
| 6,499,791 B2 | * | 12/2002 | Wheatley ............... 296/100.16 |

* cited by examiner

*Primary Examiner*—D. Glenn Dayoan
*Assistant Examiner*—Greg Blankenship
(74) *Attorney, Agent, or Firm*—W. Scott Carson

(57) ABSTRACT

A retainer system for vehicle soft tops and tonneau covers. The system includes a belt attached to the edge of the fabric of the top or tonneau cover and a channel member mounted on the vehicle to selectively receive the belt. The belt is provided with a stop mechanism to positively prevent the belt from peeling out of the retaining channel member farther than desired. In the preferred embodiments, the stop mechanism is a notch or cutout in the belt. With the present retainer system, the notch will effectively stop the peel or withdrawal of the belt from the retaining channel at a predetermined location along the channel. In this manner, the belt and attached top or tonneau cover can be partially removed from engagement along the channel member to make it easier and quicker for the operator to perform a number of desirable tasks.

15 Claims, 12 Drawing Sheets

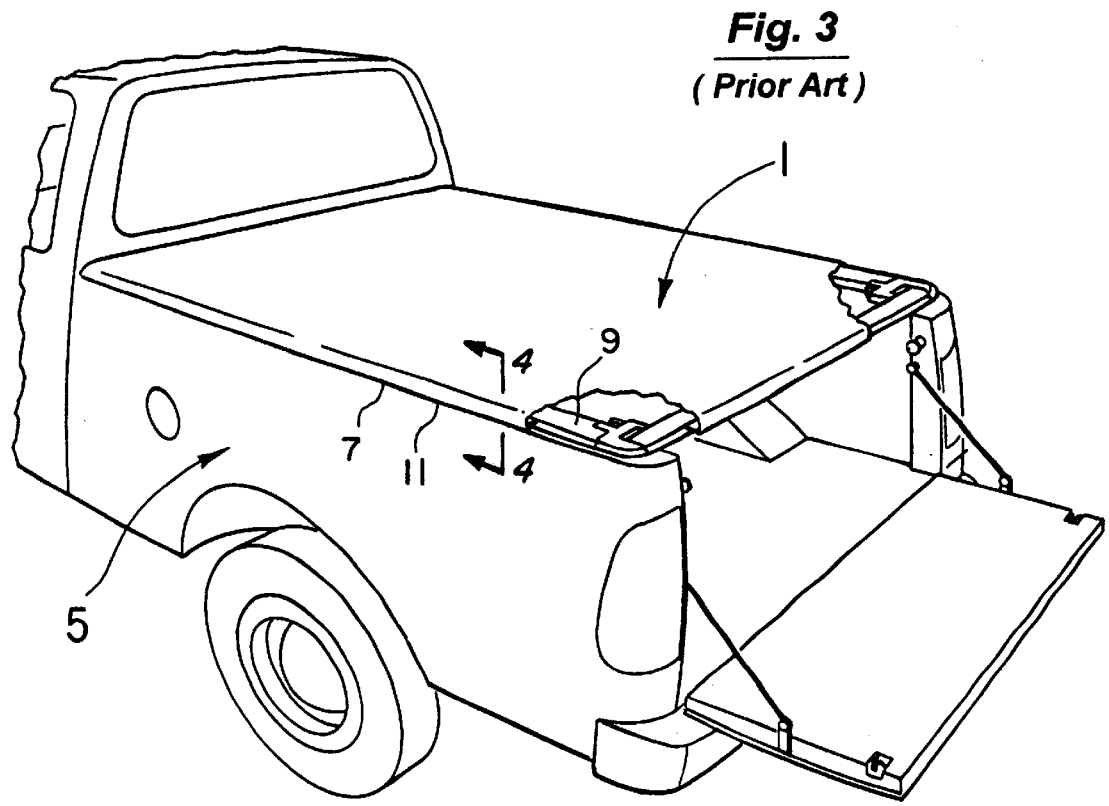
Fig. 3
(Prior Art)
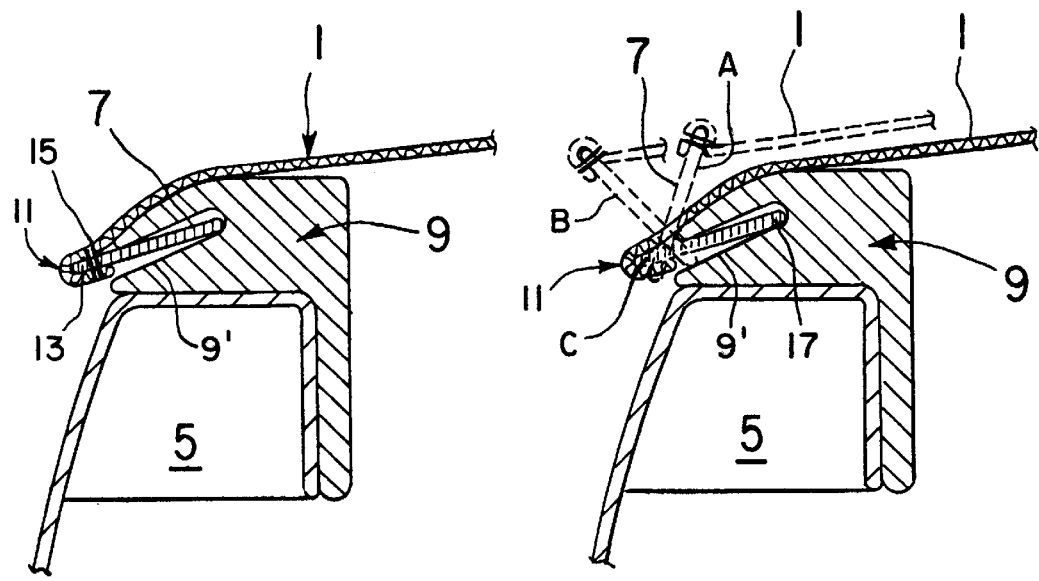
Fig. 4
(Prior Art)
Fig. 5
(Prior Art)

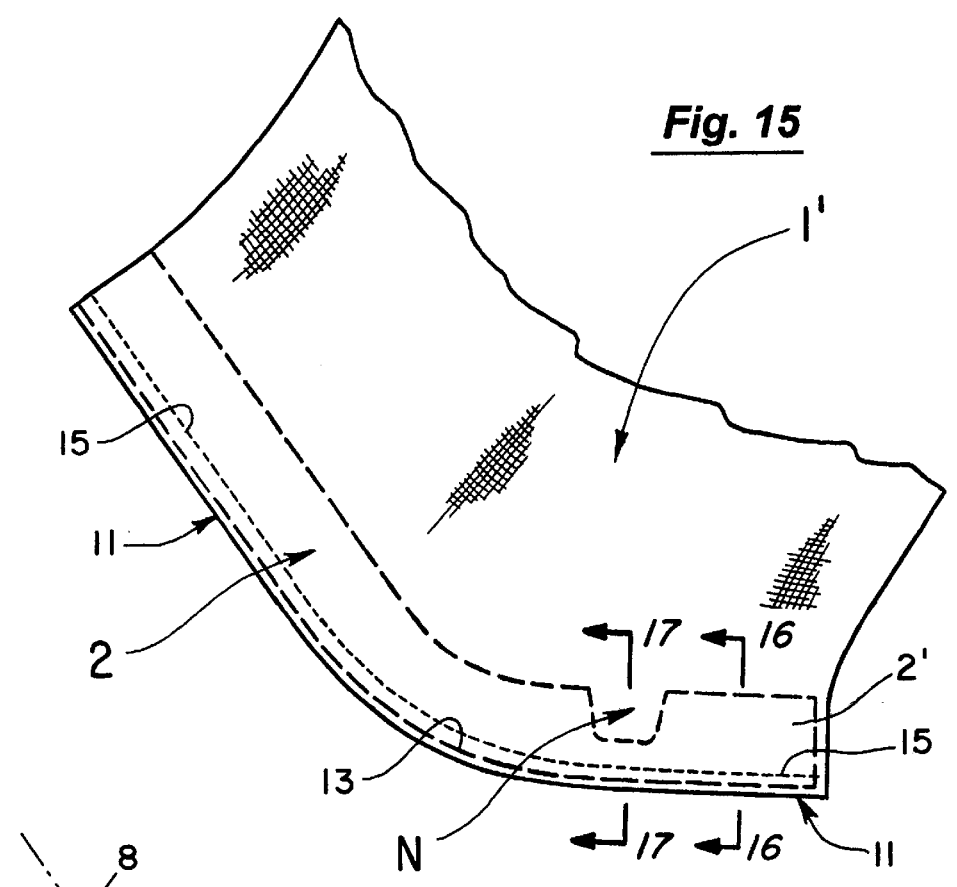
*Fig. 15*
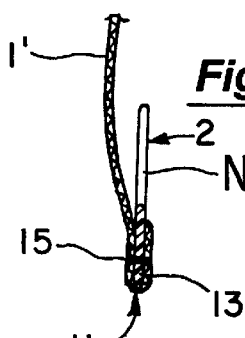
*Fig. 16*  *Fig. 17*
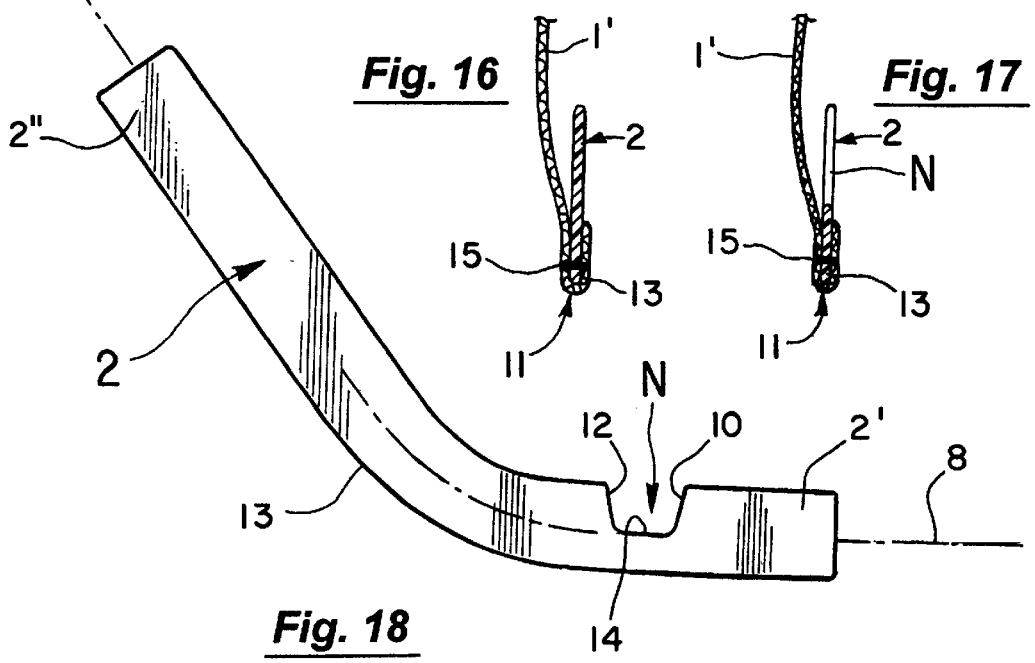
*Fig. 18*

RETAINER SYSTEM FOR VEHICLE SOFT TOPS AND TONNEAU COVERS

RELATED APPLICATIONS

This application claims the benefit of U.S. Provisional Patent Application Serial No. 60/340,102 filed Oct. 29, 2001.

BACKGROUND OF THE INVENTION

1. Field of the Invention

This invention relates to the field of fabric soft tops and tonneau covers for vehicles and more particularly to the field of retainer systems for removably securing such soft tops and tonneau covers to the vehicles.

2. Discussion of the Background

Securing a soft top or tonneau cover made of fabric-like material such as canvas or vinyl to the body of a vehicle has always presented challenging design problems. Co-owned U.S. Pat. No. 4,757,854 in this regard taught a very effective way to accomplish this in which a belt or flange was attached to the edge of the flexible, fabric top and inserted into a U-shaped channel mounted on the vehicle body. In doing so, the flexible top was first pulled taut and then slightly stretched. This placed the resilient top under a small tension as the belt was manually manipulated into the channel; and, the resulting tension was then used to seat and maintain the belt with the attached top in the channel.

This approach of U.S. Pat. No. 4,757,854 has been an industry standard for years. It is particularly useful in attaching long stretches of the top or tonneau to the vehicle. In doing so, it is only necessary to initially manipulate a lengthwise portion of the belt into the channel and the resulting forces then create a twisting or wave effect along the remaining length of the belt. This twist or wave travels down the length of the belt and greatly aids the person in inserting the rest of the belt in the retaining channel. The twisting or wave effect also works in reverse to quickly and easily aid the operator in removing the belt and attached top or tonneau from the retainer channel. That is, only a small portion of the belt needs to be initially removed from the retaining channel and then the twisting or wave effect will essentially peel the belt lengthwise out of the retaining channel.

In nearly all applications, this prior retaining system will outperform all others. However, in certain situations, the wave or peel of the belt can be a drawback. For example, if the operator only wants to detach a small portion of the belt (e.g., to fold back only a corner or the last foot or so of a tonneau cover to place a grocery bag or other item in the box of the pick up truck or other vehicle), the peel effect may cause the cover to essentially take off and detach the belt much farther than desired. In another situation when the operator may want to attach the removable rear panel to the rest of the soft top for a sport utility vehicle, he or she may find it difficult to reach and start the zipper attachment. Often, the operator will then remove the rear section of the belt to provide some slack in the top. However, he or she quickly discovers that the otherwise desirable wave or peel effect may have taken over. The released belt section may then continue to detach itself much farther than was desired or necessary to provide enough slack to reach and start the zipper attachment for the rear panel. In this corner area of the vehicle, the belt may even continue to detach itself completely around the corner and for a considerable length along the side of the vehicle. The operator may then have to re-attach a considerable length of the belt.

With this in mind, the present invention was developed. In it, the belt of the prior system has been provided with a notch or stop along its length. In operation and in a number of applications, the notched belt of the present invention provides an effective stop to the wave or peel of the prior system. This enables the user to manipulate the top or tonneau cover in a number of new and desirable ways without having the belt take off and detach any farther than is desirable or necessary to accomplish the desired tasks.

SUMMARY OF THE INVENTION

This invention involves a retainer system for vehicle soft tops and tonneau covers. The system includes a belt attached to the edge of the fabric of the top or tonneau cover and a channel member mounted on the vehicle to selectively receive the belt. The belt of the present invention is provided with a stop mechanism to positively prevent the belt from peeling out of the retaining channel member farther than desired. In the preferred embodiments, the stop mechanism is a notch or cutout in the belt. With the present invention, the notch will effectively stop the peel or withdrawal of the belt from the retaining channel at a predetermined location along the channel.

In this manner, the belt and attached top or tonneau cover can be partially removed from engagement along the channel member to make it easier and quicker for the operator to perform a number of desirable functions. In one application, the rear corner area of the soft top can be detached from the rear channel member to slacken the side curtain of the top for easier attachment of the rear panel zipper. In doing so, the belt will not take off and peel or disengage from the rear channel any farther than is desired or necessary to easily reach and start the tracks of the zipper. In another application, the stop mechanism provided by the notch in the belt will allow the operator to raise only a corner of a tonneau cover to retrieve or place a small item into the box of the pickup truck or other vehicle. The stop mechanism can also be used to allow the operator to roll or fold the rear of the tonneau cover forward only one or two feet to provide limited access to the box. In doing so, the side belts of the cover will not take off and peel farther toward the front of the vehicle than desired. The notched stop of the belts can additionally be used with other folded or pivoted parts such as sunroofs to provide not only a predetermined limit to the disengagement of the belts but also a natural fold line at the notch. The notched portion of the belts in this regard provides not only a stop but also a living hinge for the folded or pivoted part. In all of the preferred applications, the notched approach of the present invention maintains the ease of attachment of the fabric to the belts during the manufacturing process and serves to create a neat and smooth appearance of the top or cover as mounted on the vehicle.

BRIEF DESCRIPTION OF THE DRAWINGS

FIG. 3 is partially broken away view of the tonneau cover and vehicle of FIG. 1.

FIG. 4 is a view taken along line 4—4 of FIG. 3.

FIG. 5 is a view similar to FIG. 4 illustrating how the belt attached to the tonneau cover of FIGS. 1–4 can be progressively manipulated to secure it in the retaining channel member.

FIG. 15 is a view of the notched belt of the present invention as attached to the rear corner area of a soft top.

FIG. 16 is a cross sectional view taken along line 16—16 of FIG. 15.

FIG. 17 is a cross sectional view taken along line 17—17 of FIG. 15.

FIG. 18 is a view of the notched belt of the present invention prior to being attached to the soft top of FIG. 15.

DETAILED DESCRIPTION OF THE INVENTION

Figure 1:
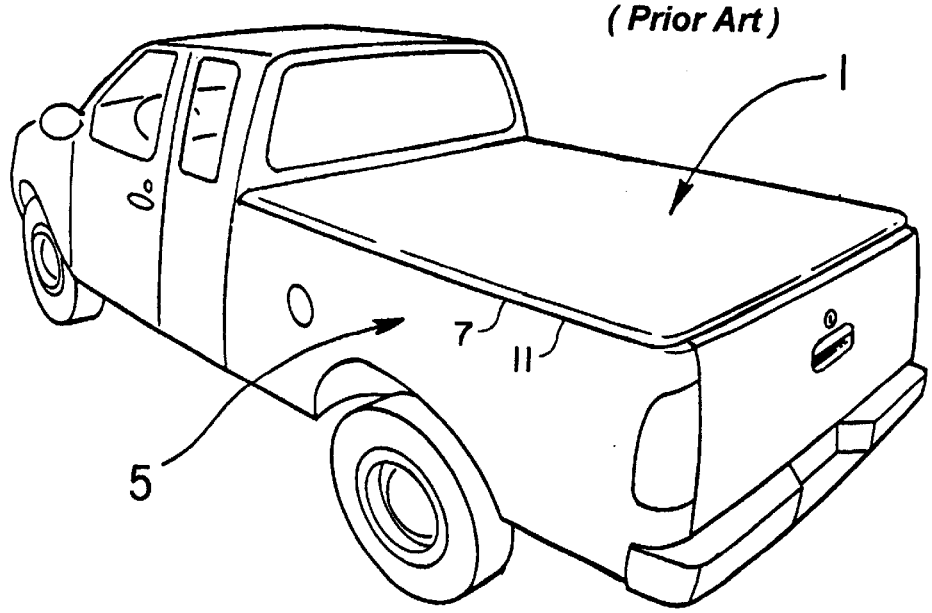
FIG. 1 is a perspective view of a pickup truck with a prior art tonneau cover secured over the box of the vehicle.
Figure 2:
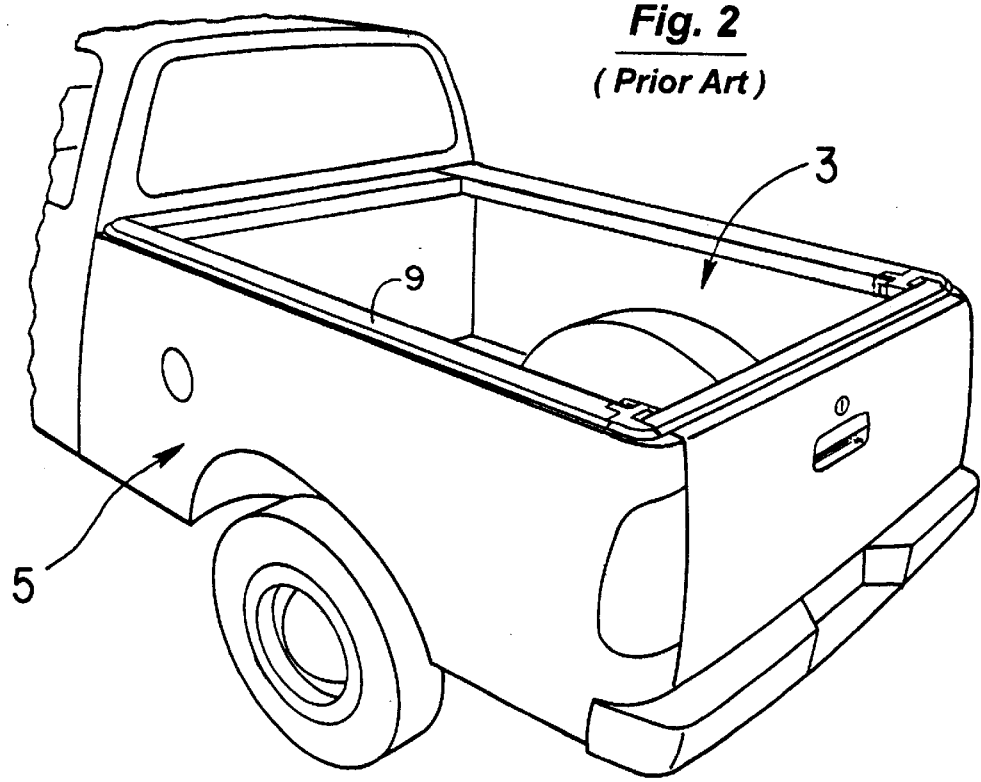
FIG. 2 is view similar to FIG. 1 but with the cover removed from the vehicle.

In the known retainer system illustrated in FIGS. 1–4, the flexible tonneau cover 1 is removably secured about the box 3 of the vehicle 5 by an arrangement of belts 7 and channel members 9. This prior art system is also disclosed in co-owned U.S. Pat. No. 4,747,854. Basically, this system operates by sewing belts like 7 in FIG. 4 along each edge 11 of the tonneau cover 1. The tonneau cover 1 in this regard is commonly made of a durable fabric-like material such as canvas or vinyl. Each edge 11 of the tonneau cover 1 (see again FIG. 4) has a portion wrapped around or otherwise aligned with an edge 13 of the belt 7 and sewn in place by stitching 15. In operation as best seen in FIG. 5, the belt 7 can first be manipulated relative to the channel member 9 to the position A shown in dotted lines. Using the channel member 9 as a fulcrum, the belt 7 can then be manually rotated in the manner of a lever to position B. This not only draws the tonneau cover 1 taut but also slightly stretches and tensions the fabric of the cover 1. As the belt 7 in FIG. 5 is further rotated about the channel member 9 from position B, the tension created in the tonneau cover 1 helps to draw and seat the belt 7 (position C) in the retaining channel 9' in the member 9. Preferably, the free edge 17 of the belt 7 in this retained position C as shown in full lines in FIGS. 4 and 5 is actually abutting the bottom of the channel 9'.

Figure 6:
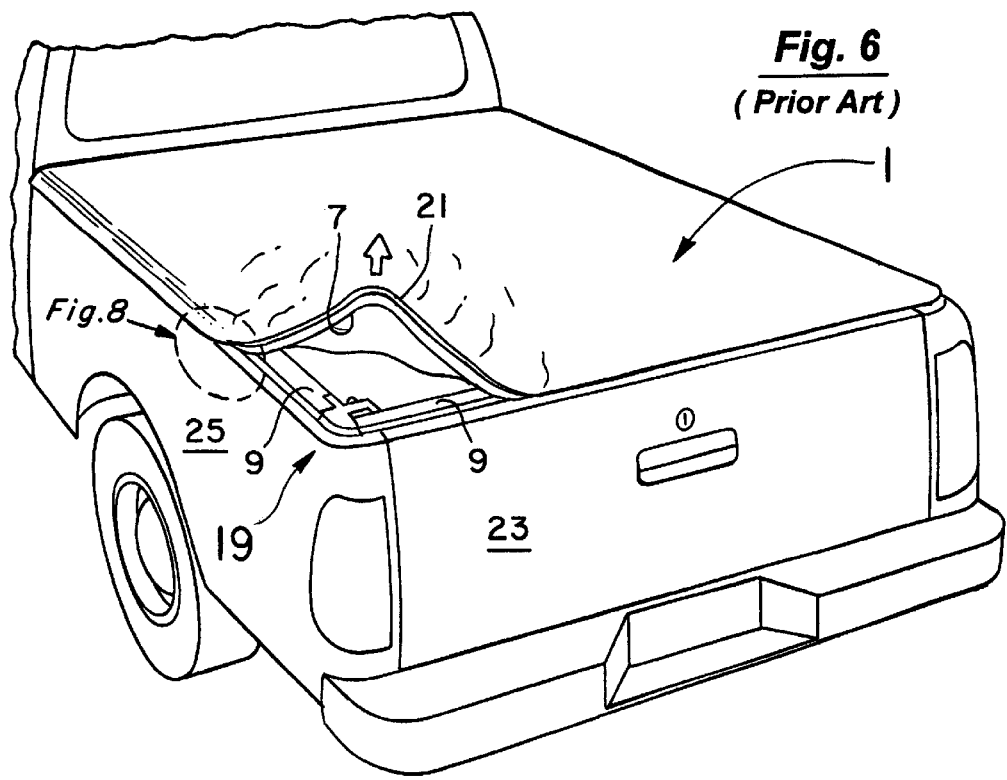
FIG. 6 is a perspective view of the prior art tonneau cover of FIG. 1 with a corner of it being lifted to provide limited access to the bed of the vehicle to retrieve or place a small item such as a grocery bag in the bed of the vehicle.

The belt of this known system can be cut into a number of individual lengths or segments (e.g., one for each side of the rectangular cover 1) or can be continuous as in FIG. 6 to go around corners of the vehicle 5 such as 19. Regardless, and if the operator for example only wants to release the corner 21 of the cover 1 in FIG. 6 to gain limited access to the box of the vehicle 5 to retrieve a small item, he can simply lift the belt 7 at the corner 21 out of the rear and side retainer channels 9. In doing so, the belt 7 along the rear wall (i.e., tailgate 23) and side wall 25 will come out of the respective channel members 9 the desired one or two feet in a peel or wave-like manner. Unfortunately, there is no stop for the peel or wave and the belt 7 tends to take off and continue to peel out of the channel members 9 almost all the way along the rear wall 23 and side wall 25 (see FIG. 7).

Figure 7:
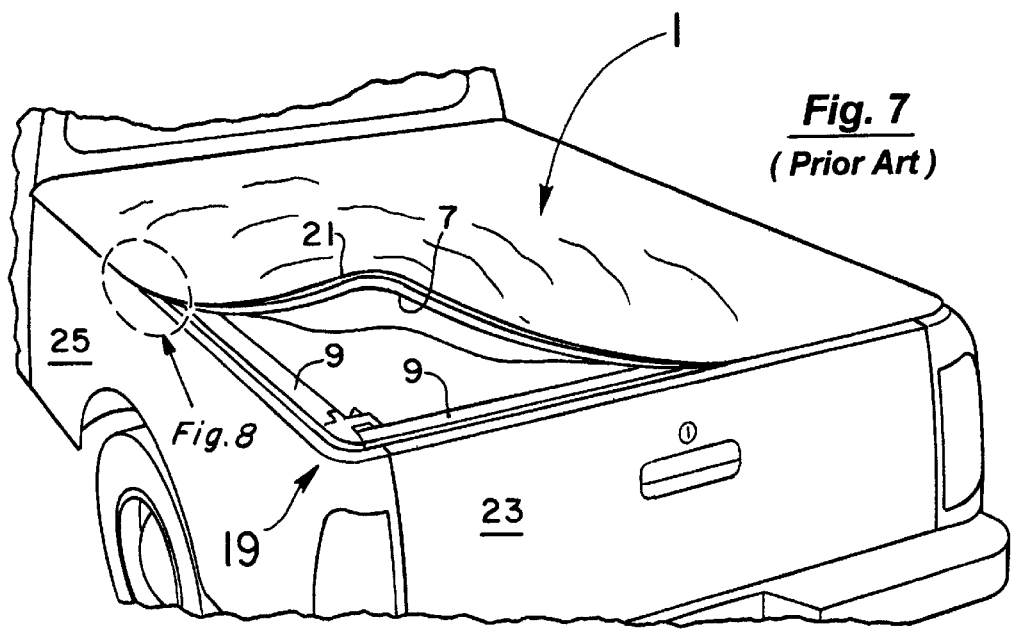
FIG. 7 illustrates how the lifting of the tonneau corner in FIG. 6 can undesirable cause the belts attached to the cover to take off and peel out of their retaining channels beyond the desired position of FIG. 6.
Figure 8:
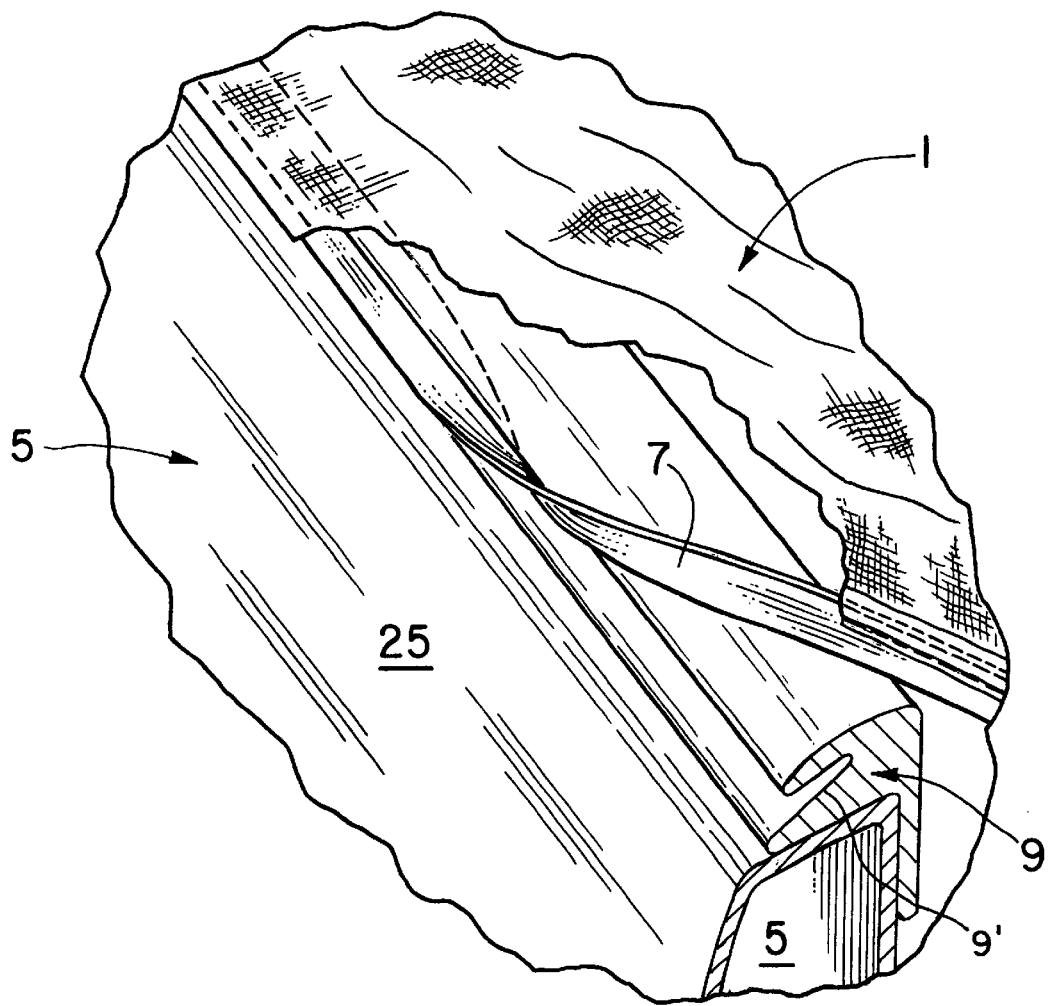
FIG. 8 is an enlarged view of the peeling effect that occurs in the areas indicated in FIGS. 6 and 7.

This peel or wave as illustrated in FIG. 8 tends to happen in part because the fabric tonneau cover 1 is slightly stretched and tensioned. Consequently, the tension will continue to pull the belt 7 out of the channel member 9 once the peel or wave is begun. The manual forces applied to initially twist the belt 7 about its longitudinal axis to remove the belt 7 from the channel 9' in the member 9 also play a part. It is noted in this regard that the peel or wave effect is most desirable in helping to initially insert the belt 7 into the channel member 9 and to remove the belt entirely from the channel member 9 as discussed above. However, as illustrated in FIGS. 6–8, it can be a drawback if is desirable only to release a limited area such as the corner 21 of the tonneau cover 1 as in FIG. 6.

Figure 9:
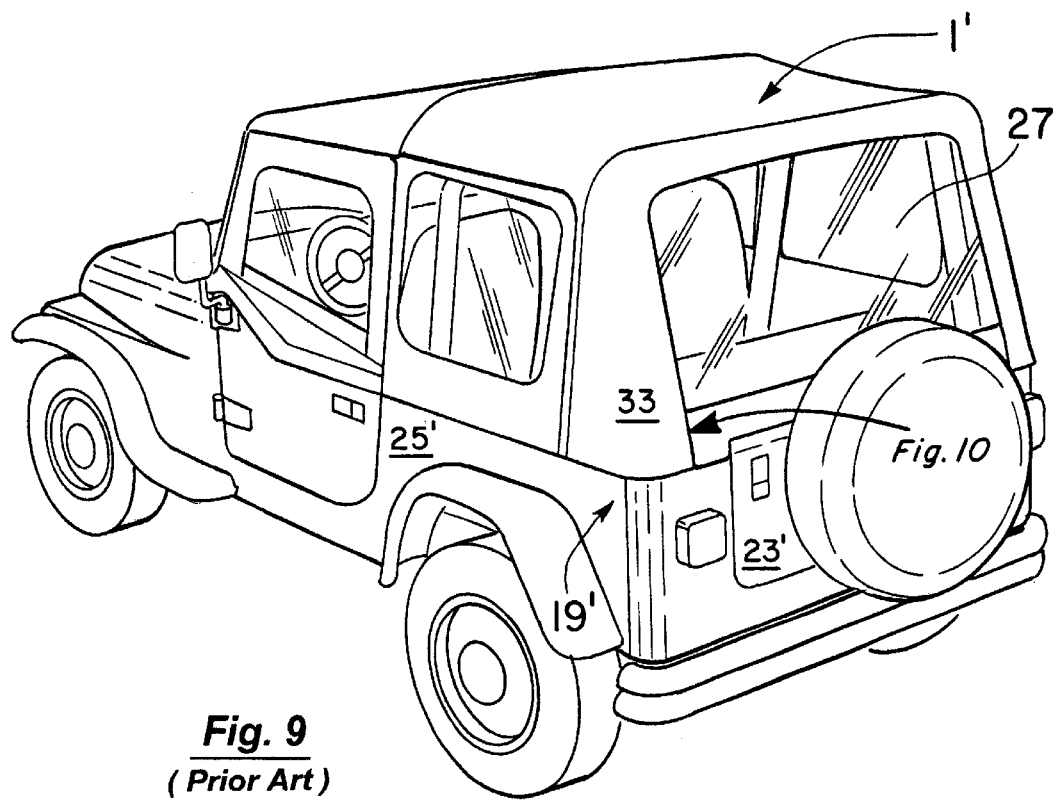
FIG. 9 is a perspective view of a prior art soft top on a sport utility vehicle.
Figure 10:
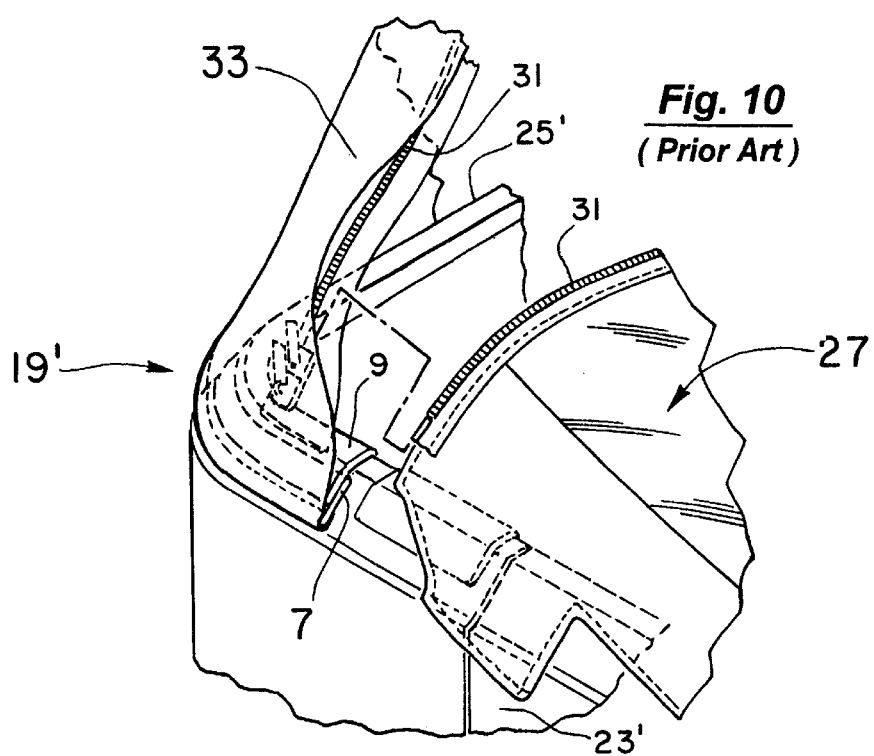
FIG. 10 is an enlarged view of the rear corner area of the vehicle and soft top of FIG. 9.

The same problem can occur in the corner area 19' of the soft top 1' of FIG. 9. That is, soft tops such as 1' normally have a clear or windowed, rear panel 27 that is removably attached by the zipper tracks 31 (see FIG. 10) to the side curtain 33 of the top 1'. The side curtain 33 as illustrated in FIG. 10 is secured around the vehicle corner 19' by the belt 7 and channel member 9. In this secured position of FIG. 10, the side curtain 33 is held tautly in place. It is then sometimes very difficult to manually grip, align, and start the tracks 31 of the zipper. Consequently, many operators then release the rear end of the belt 7 (see FIG. 11) from the channel member 9 adjacent the tailgate 23'. This provides enough slack in the side curtain 33 to easily grip, align, and start the tracks 31 of the zipper. However, in doing so as in FIGS. 6–8, the belt 7 undesirably tends to take off and peel around the corner 19' and along the vehicle side 25' as in FIG. 12.

Figure 11:
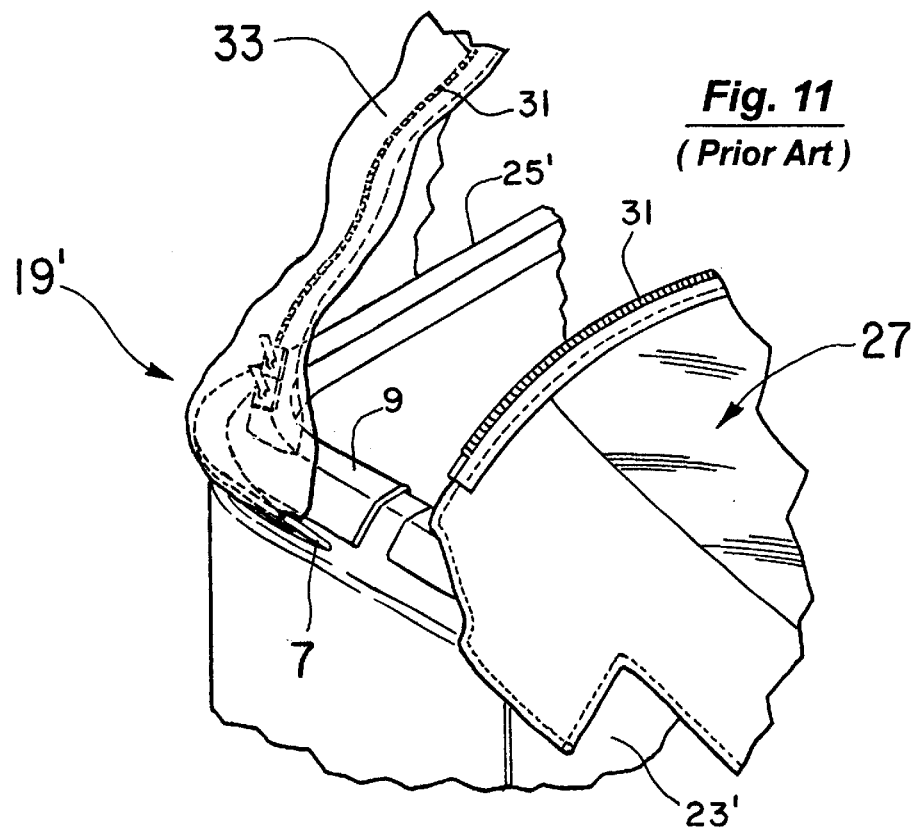
FIG. 11 is a view similar to FIG. 10 with the rear section of the belt partially removed from the rear retaining channel. This will provide slack in the side curtain of the top to facilitate the initial engagement of the zipper between the rear panel and side curtain of the top.
Figure 12:
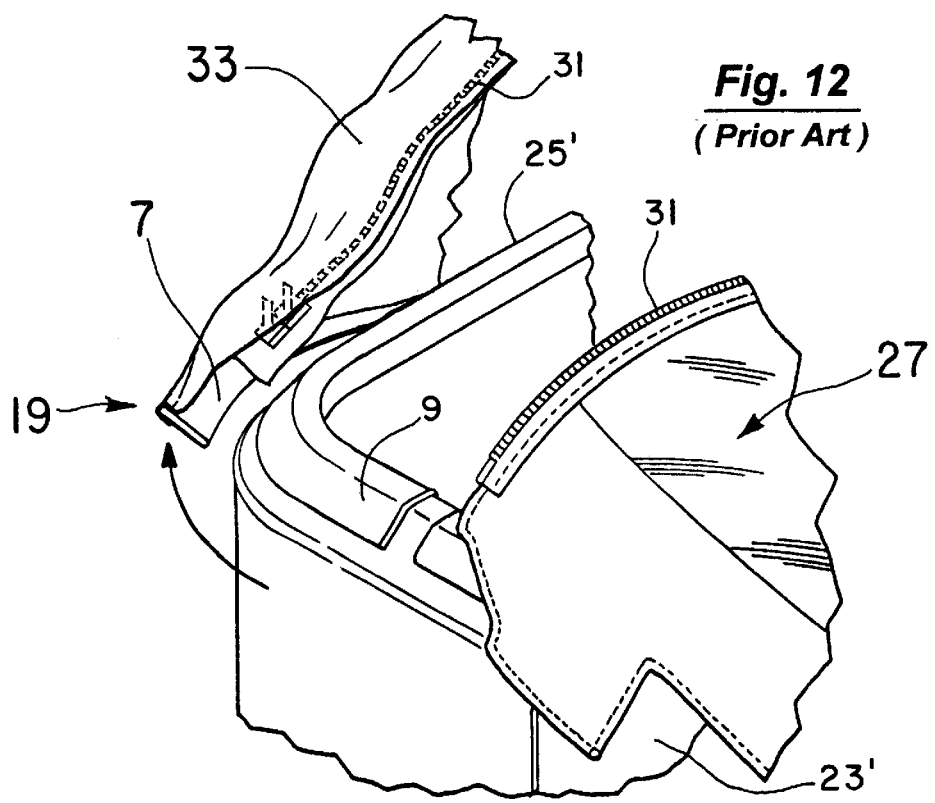
FIG. 12 illustrates how the operation of FIG. 11 may result in the belt undesirably peeling out of the retaining channel completely around the corner of the vehicle.
Figure 13:
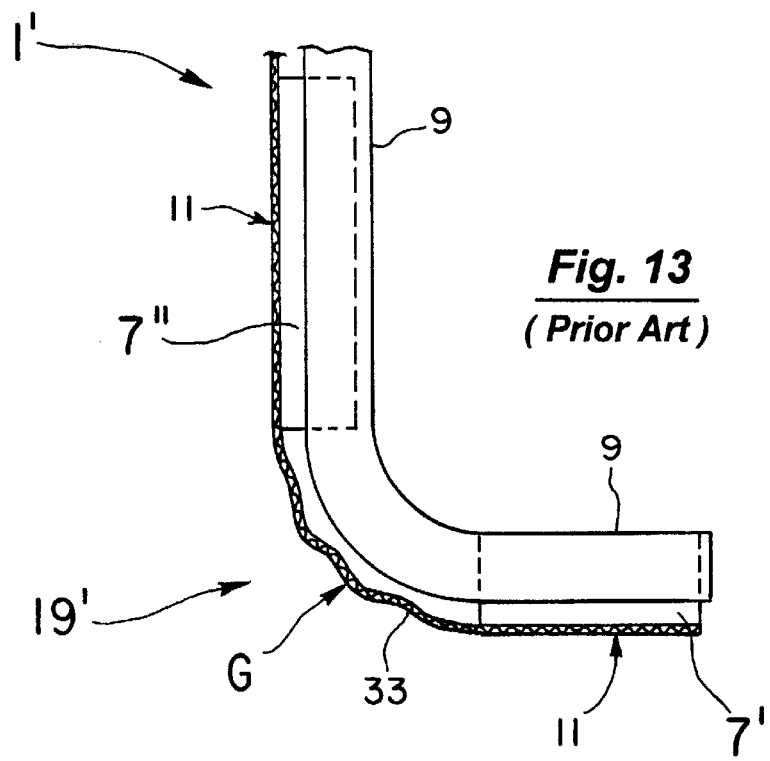
FIG. 13 is a top plan view of the corner of a prior art soft top which has been provided with two, spaced-apart belt segments on each side of the corner.
Figure 14:
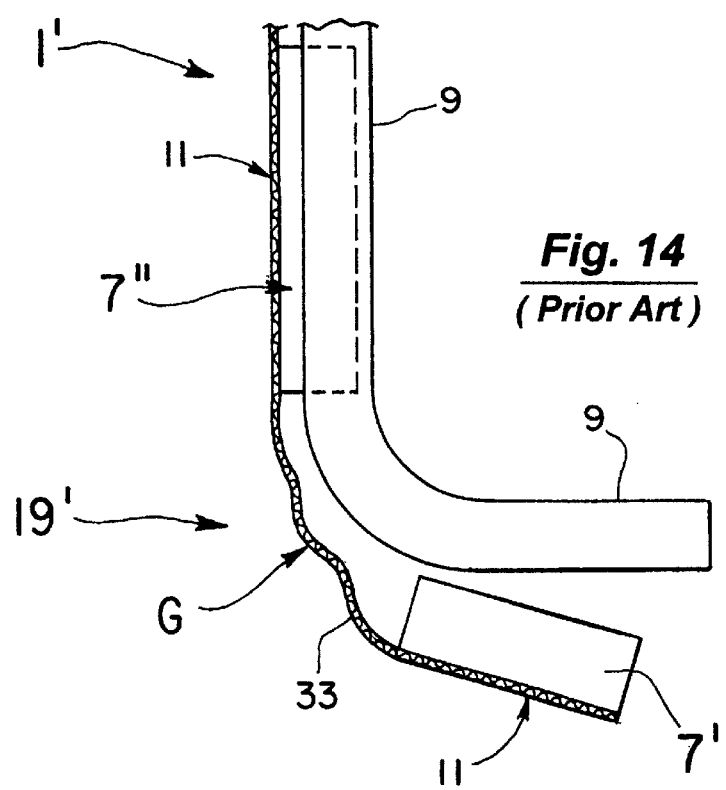
FIG. 14 is a view similar to FIG. 13 showing the rear belt segment in a position released from the rear retaining channel to create slack in the side curtain of the top.

One known solution to this problem of FIGS. 10–12 is to cut the belt 7 into segments 7' and 7" as in FIGS. 13 and 14. In this manner, the rear section 7' can be individually released from the rear of the channel member 9 (see FIG. 14) to provide the desired slack in the side curtain 33. In doing so, the physical gap G between the belt segments 7' and 7" will stop any peel or wave. However, when the space-apart belt segments 7' and 7" are secured back in place in the channel member or members 9 as in FIG. 13, the gap G does not present a smooth and neat appearance at the corner 19'. This occurs because there is no underlying belt around the curve at G to reinforce the fabric of the top 1' and the fabric tends to gather and wrinkle in the gap G. The corner area 19' is also not very strong because there is no reinforcing belt under the fabric and the fabric may tear.

The gapped solution of FIGS. 13 and 14 also presents an undesirable manufacturing problem in that each belt segment 7' and 7" must be individually aligned with the respective edge portions 11 of the fabric top 1' and individually sewn to it. This is true whether the edge portions 11 are wrapped around the edges of the belt segments 7" and 7" or merely laid flat against one surface of the belt segments 7' and 7". In contrast, if the belt is continuous, it can be aligned in one step along the entire edge 11 of the fabric top 1' and then sewn in place in one pass. This is an important advantage in the mass production of the tops 1'. That is, the need to align and sew two belt segments 7' and 7" as compared to one greatly adds to the time and cost of assembly. It also can result in the segments 7' and 7" being slightly misaligned with each other and the fabric edge 11 which can significantly detract from the appearance of the assembled top 1'.

Figure 19:
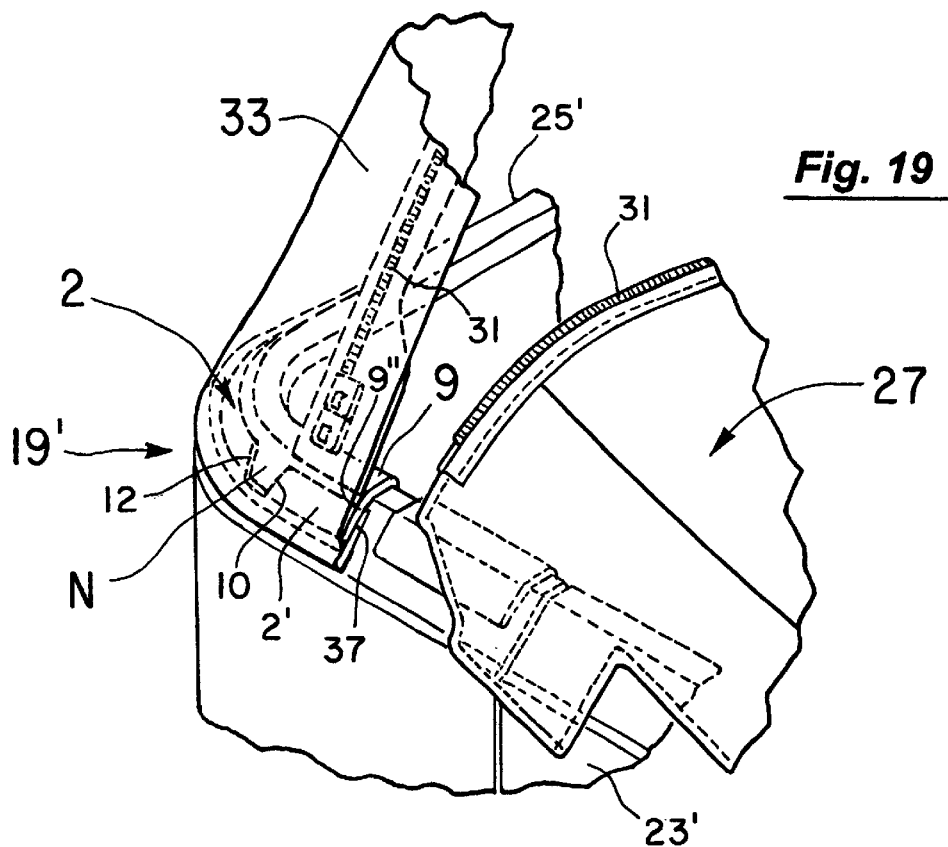
FIG. 19 is an enlarged view similar to FIG. 10 but showing the notched belt of the present invention in use to secure the soft top to the corner of the vehicle.
Figure 20:
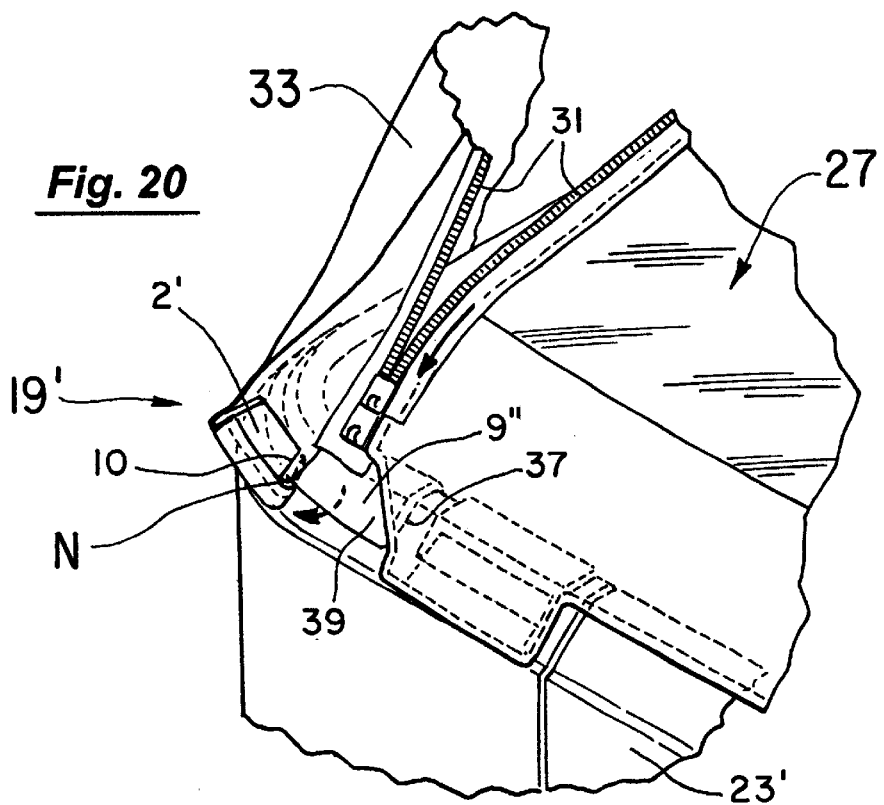
FIG. 20 is a view showing the end section of the notched belt of FIG. 19 in its released position from the rear retaining channel to provide slack in the side curtain of the top yet at the same time provide a positive stop to the peel action of the belt.

To specifically solve the problem of the peel or wave effect yet not present the assembly and appearance problems of using spaced-apart belt segments such as 7' and 7" in FIGS. 13–14, the notched belt 2 of the present invention as illustrated in FIGS. 15–18 was developed. In a simple but effective solution, the continuous belt 2 of FIG. 15 is provided with a notch or cutout N. In the manner of FIG. 4, the edge 11 of the fabric top 1' can still be wrapped around or otherwise aligned with the edge 13 of the belt 2 (see FIGS. 15–17) and easily and quickly sewn in place at 15 in a single pass along the entire length of the belt 2. Additionally, as illustrated in FIG. 19, the belt 2 can be used to extend continuously around the vehicle corner 19'. However, unlike the belt 7 of FIGS. 10–12, the notched belt 2 of the present invention can be partially released at the end portion 2' from the rear of the channel member 9 (see FIG. 20) and will not continue to undesirably peel or wave around the corner 19' as in FIG. 12. Rather, as shown in FIG. 20, the notch N will stop the peel or wave at the desired, predetermined position of FIG. 20. The side curtain 33 can then be partially released to provide enough slack for the operator to easily align the tracks 31 to start the zipper. Yet, the belt 2 will go no further than desired. Once the rear panel 27 is zipped in place, the released end portion 2' of the belt 2 can be easily and quickly secured back into the rear of the channel member 9 into the position of FIG. 19. In this secured position of FIG. 19, a neat and smooth appearance is then presented by the top 1' at the corner 19'.

Referring again to FIG. 18, the belt 2 as illustrated extends continuously between the end portions 2' and 2" along the longitudinal axis 8. The notch N between the end portions 2' and 2" can have a number of shapes (e.g., V-shaped, U-shaped) but is preferably defined as shown by sides 10, 12, and 14. Sides 10 and 12 are substantially parallel to each other and substantially perpendicular to the longitudinal axis 8. Side 14 in turn joins sides 10 and 12 and is substantially parallel to the longitudinal axis 8. The notch N as illustrated then opens in a direction substantially perpendicular to the longitudinal axis 8 of the continuous, one-piece belt 2. In use in the secured position of the belt 2 in the channel member 9 as discussed above and as shown in FIG. 19, the opposing sides 10 and 12 of the notch N are both positioned in the channel member 9 adjacent the underside 37 of the planar lip portion 9". In the stopped position as illustrated in FIG. 20, the end portion 2' of the belt 2 has been manually withdrawn from the underside 37 of the channel lip portion 9" and the belt 2 peeled to the point that the lip portion 9" at the predetermined stop location of FIG. 20 is received between the sides 10 and 12 of the notch N. That is, the notch side 12 of the notch N in this position of FIG. 20 remains in the channel member 9 (see FIG. 19) adjacent the underside 37 of the channel lip portion 9". In contrast, the withdrawn end portion 2' of the belt 2 including the side 10 of the notch N in FIG. 20 are now adjacent the outer side 39 of the lip portion 9". In this position of FIG. 20, the belt 2 is then effectively stopped by the notch N from further peeling out of the channel member 9.

Figure 21:
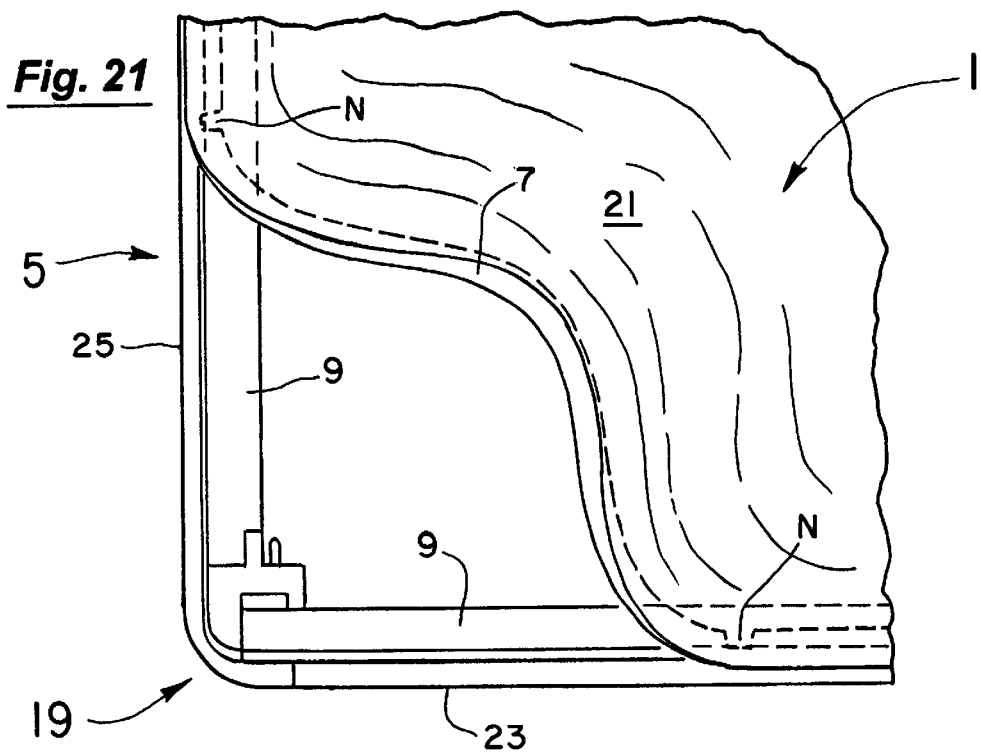
FIG. 21 is plan view of the lifted corner of a tonneau cover as in FIG. 6 but employing the belt notches of the present invention to provide positive stops on each side of the corner so only the desired amount of the tonneau corner is released from the vehicle.

The runaway problem of FIGS. 6–8 at the corner 21 of the tonneau cover 1 can also be solved by the notched approach of the present invention. As illustrated in FIG. 21, the belt 2 adjacent the tonneau corner 21 can be notched at N on one or both sides of the tonneau corner 21. Consequently, when the tonneau corner 21 is lifted as in FIGS. 6 and 21, it will be positively stopped at the desired location to provide limited access to the box of the vehicle 5 to retrieve or place a small item such as a grocery bag into the box. Such stopping and notching can be accomplished at the corner 19 using the continuous belt 2 as illustrated in FIG. 21 or by using separate, notched belt segments along each of the sides of the rectangular tonneau cover 1. However, a continuous belt 2 is preferred for ease of manufacture and for its neat and smooth appearance around the corner 19.

Figure 22:
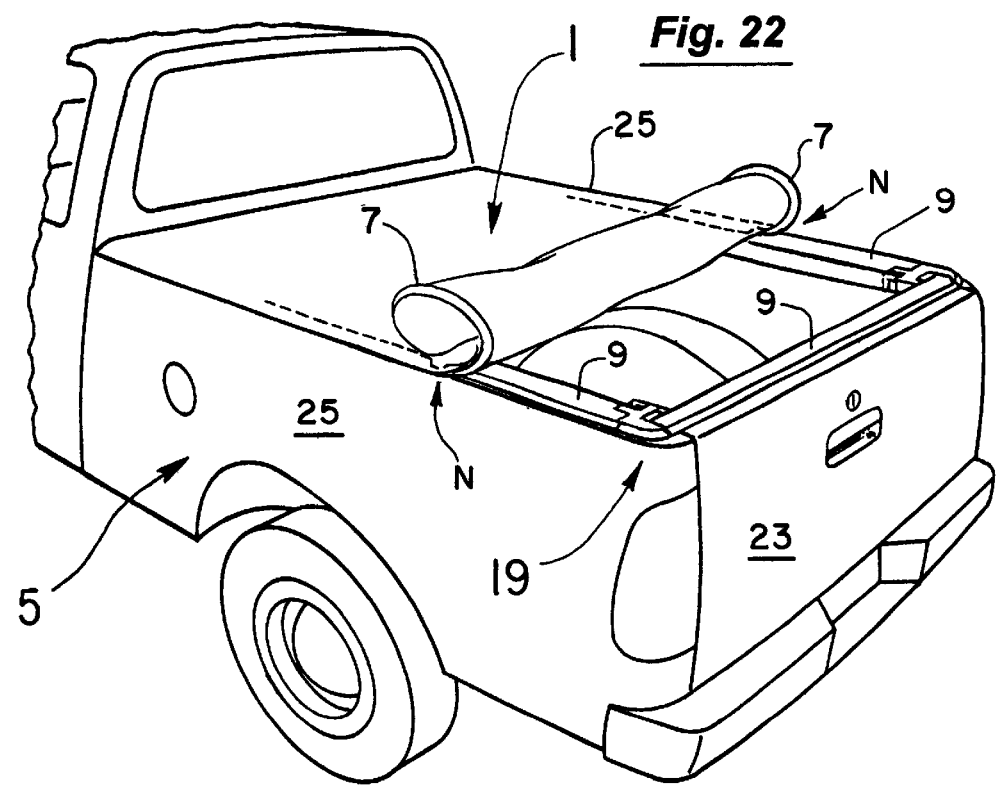
FIG. 22 shows the application of the present invention to the side belts of a tonneau cover so that a predetermined portion of the rear of the cover can be rolled or folded back and positively stopped to provide limited access to the box of the vehicle.

In addition to solving the corner lifting problem of FIGS. 6–8, the notching approach of the present invention as illustrated in FIG. 22 can be provided along each side 25 of the vehicle 5 to enable the rear of the tonneau cover 1 to be rolled or folded open a limited amount as in FIG. 22. In doing so, the cover 1 will be stopped and will not take off toward the front of the vehicle 5 beyond the desired position of FIG. 22.

Figure 23:
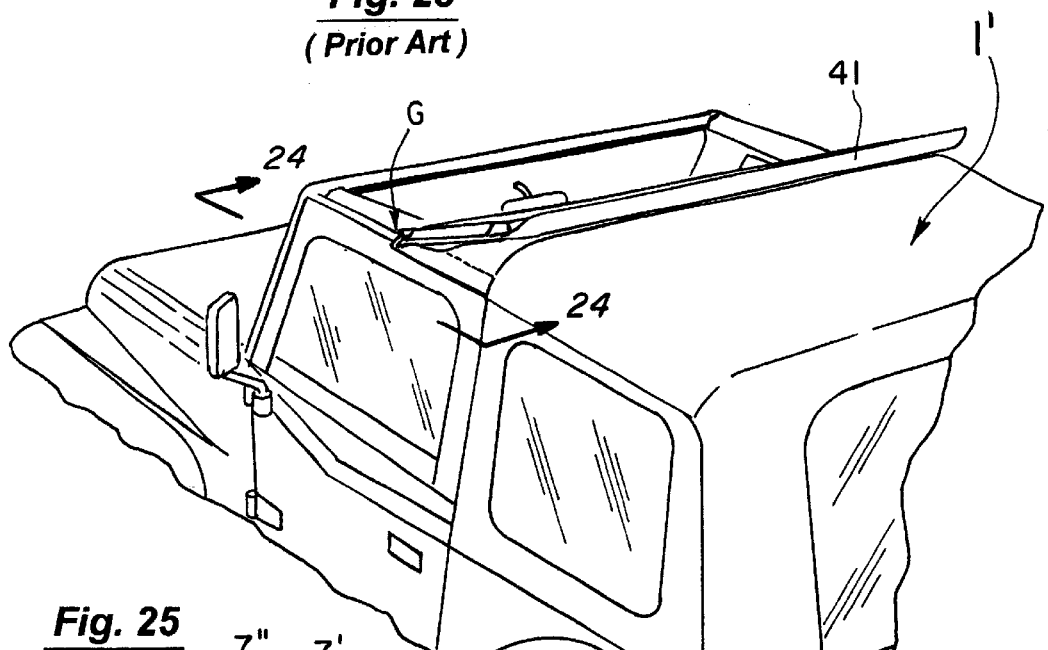
FIGS. 23–25 show a prior art top on a sport utility vehicle in which the attachment above the door for the sunroof has spaced-apart belt segments with the inherent manufacturing, operating, and appearance drawbacks of FIGS. 13 and 14.
Figure 25:
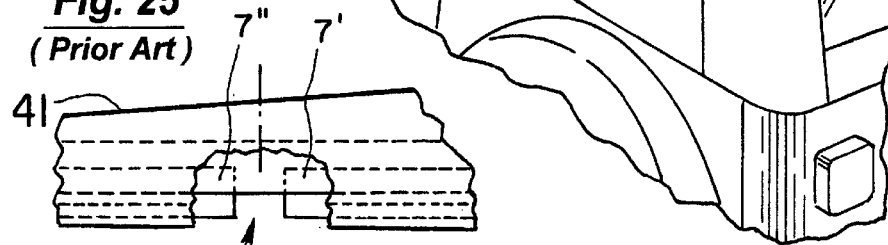
Figure 24:
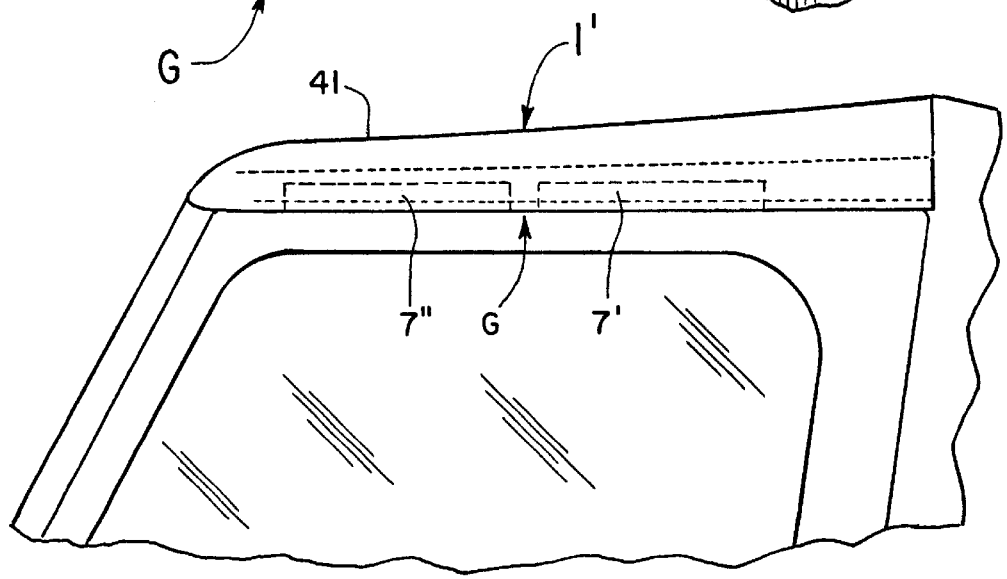
Figure 27:
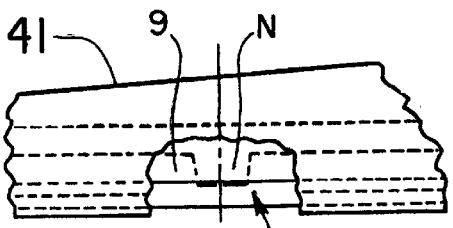
FIGS. 26–28 illustrate the application of notched belt of the present invention to the pivoted sunroof area of FIGS. 23–25 to create a positive stop to the disengagement of edge of the top at the notch in FIG. 28 as well as to create a smooth and neat appearance in the lowered position of the sunroof in FIG. 26.
Figure 26:
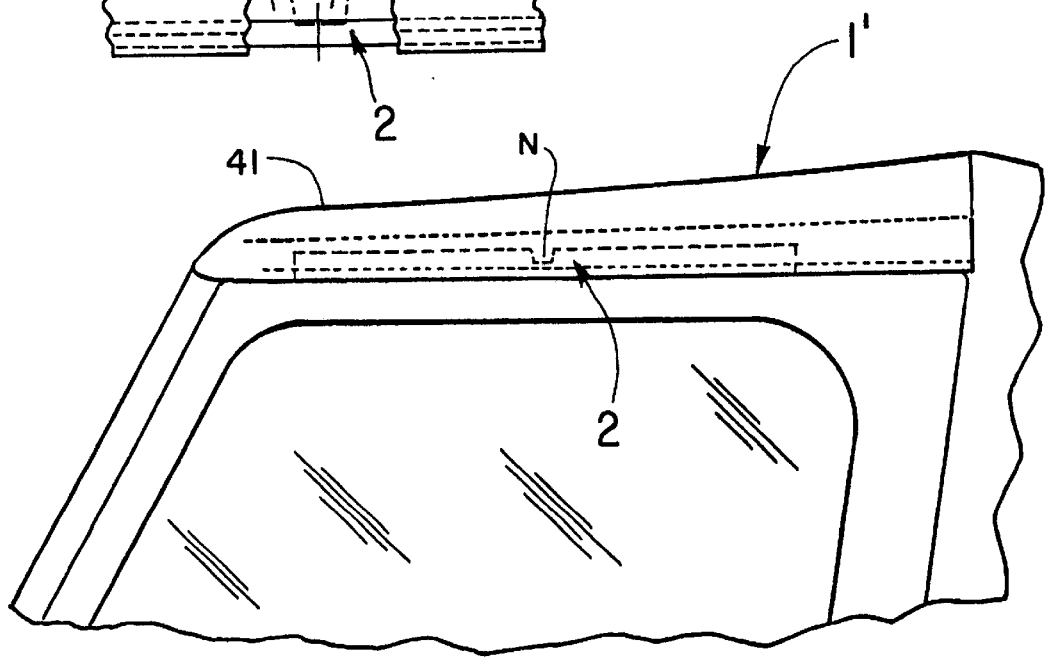
Figure 28:
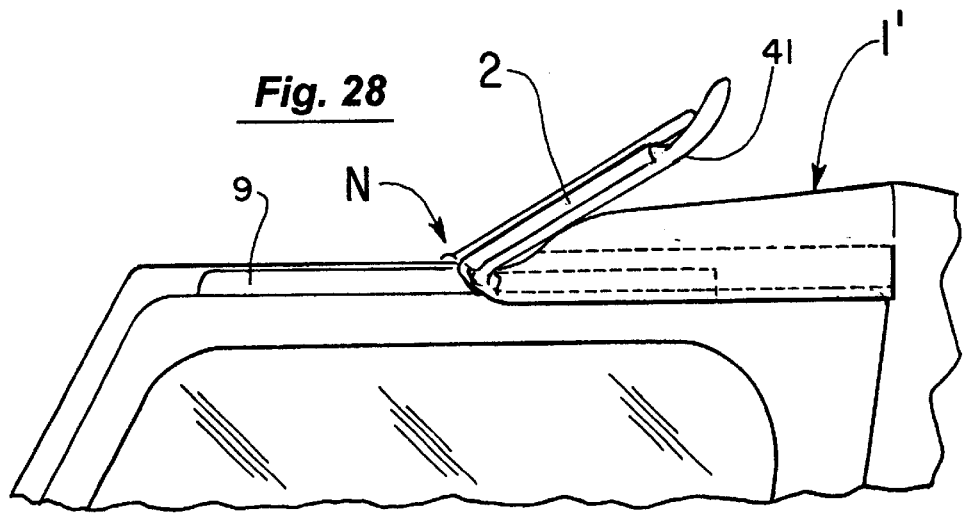

Another application of the present invention is in the environment of a pivoting member such as the sunroof 41 of FIG. 23. Presently, the pivoting or folding area G of the sunroof 41 of such tops 1' (see FIGS. 23–25) requires the use of spaced-apart belt segments 7' and 7" as in FIGS. 12 and 13. As in FIGS. 12 and 13, these spaced-apart segments 7' and 7" create problems in the manufacturing assembly of the segments to the fabric of the top as discussed above. They also may not have a neat and smooth appearance at the gap G and the gap G may be prone to tearing if not provided with a separate, reinforcing member. In contrast, with the notched approach of the present invention as illustrated in FIGS. 26–28, these problems are solved. Further, because the notch N creates a natural fold line in the belt 2, the notch N acts as a living hinge when the sunroof 41 is flipped open to the position of FIG. 28. Because the plastic of the belt 2 is relatively strong but also flexible, it can withstand the repeated bending about a transverse axis between the closed and opened positions of FIGS. 26 and 28 without fatiguing and breaking. Yet, as the sunroof 41 is pivoted to its open position of FIG. 28, the notch N will also serve to positively stop the peel or wave effect of the top 1' at the desired location of the notch N. As illustrated, the problem of the peeling belt is solved by the notch N of the present invention for both belts extending continuously along straight, longitudinal axes as well as those with longitudinal axes such as 8 in FIG. 18 that have at least a curved portion to accommodate corners of the soft tops, tonneau covers, and vehicles. Additionally and although the invention is shown in use with fabric soft tops and tonneau covers, it could be used with other accessories if desired.

While several embodiments of the present invention have been shown and described in detail, it to be understood that various changes and modifications could be made without departing form the scope of the invention.

We claim:

1. A retaining belt attached to a fabric soft top or tonneau cover for a vehicle, said belt being releasably securable in a channel member mounted on the vehicle and having a notch along a length thereof, said notch being uncovered and open to engage a portion of said channel member to stop the release of the belt from said channel member at a predetermined location along the channel member.

2. The retaining belt of claim 1 wherein said belt is continuous and curved to extend around a corner of the vehicle.

3. The retaining belt of claim 1 wherein said belt includes at least a portion thereof extending substantially straight.

4. A retaining belt to releasably secure an accessory to a vehicle, said accessory being attached to the belt and said belt being releasably securable in a channel member mounted on the vehicle, said belt extending continuously between first and second end portions and having a notch therein between said first and second end portions, said notch being uncovered and open to engage a portion of said channel member to stop the release of the belt from said channel member at a predetermined location along the channel member.

5. The retaining belt of claim 4 wherein said belt extends along a longitudinal axis between said first and second end portions and said notch opens in a direction substantially perpendicular to said longitudinal axis.

6. The retaining belt of claim 5 wherein said longitudinal axis is curved along at least a portion thereof.

7. The retaining belt of claim 5 wherein said longitudinal axis is straight along at least a portion thereof.

8. The retaining belt of claim 4 wherein said notch is defined by at least first and second sides.

9. The retaining belt of claim 8 wherein said first and second sides are substantially parallel to each other.

10. The retaining belt of clam 9 wherein said first and second sides are substantially perpendicular to said longitudinal axis.

11. The retaining belt of claim 9 wherein said first and second sides are joined by a third side.

12. The retaining belt of claim 11 wherein said third side is substantially parallel to said longitudinal axis.

13. The retaining belt of claim 8 wherein said portion of said channel member is a lip portion extending therealong and said belt at said predetermined stop location receives said lip portion in said notch between said first and second sides of said notch.

14. The retaining belt of claim 13 wherein said lip portion is substantially planar.

15. The retaining belt of claim 8 wherein said portion of said channel member is a lip portion extending therealong with first and second sides and said belt is securable in said channel member with the first and second sides of said notch adjacent the first side of said lip portion.

* * * * *